Patented Aug. 8, 1950

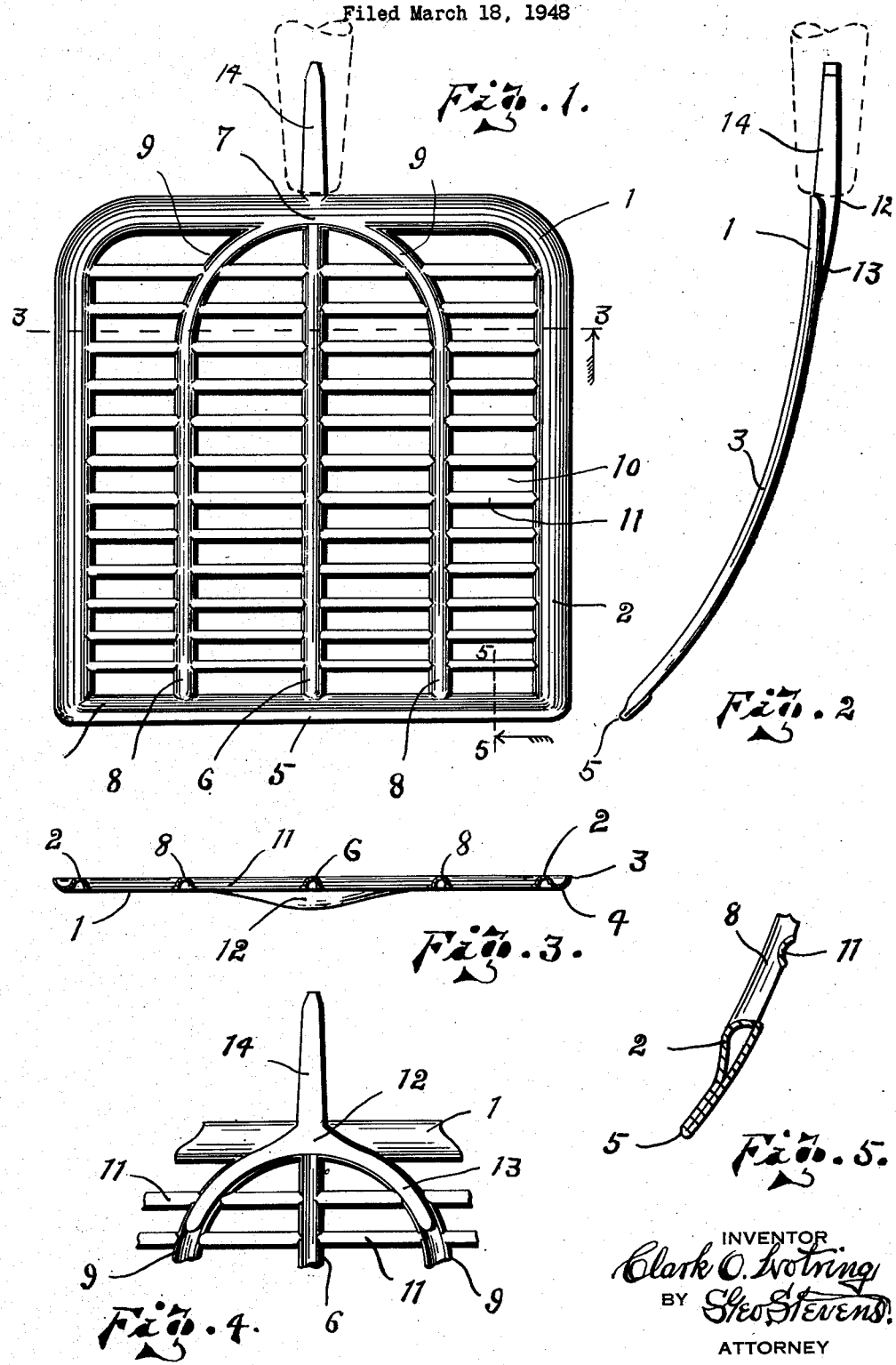

2,518,432

UNITED STATES PATENT OFFICE 2,518,432

LITTER HANDLING TOOL

Clark O. Wotring, McGregor, Minn.

Application March 18, 1948, Serial No. 15,576

2 Claims. (Cl. 294—49)

This invention relates to hand tools and has special reference to a shovel-like tool particularly adapted for manual use in handling litter such as used in poultry raising or the like.

This invention is deemed an improvement over my United States Patent Number 2,432,643 dated December 16, 1947.

One of the principal objections to a blade for attachment to a common pitch fork as disclosed in my above mentioned patent is that both a blade and a fork must be purchased in order to have a complete litter fork or shovel, thereby making the cost of the tool somewhat higher than need be. Thus, one of the principal objects of this invention is to provide a complete tool in itself which can be used efficiently for cleaning litter.

Another object is to produce such a tool or litter shovel which is inexpensive to manufacture and sell.

Another object is to produce a light weight tool which is durable and will stand hard use.

Still another object is to provide novel reenforcement for the blade of the tool which will permit light gauge material to be used in the manufacture thereof.

A further object is to produce a blade which can be stamped out of sheet metal or the like and the reenforcing portions of the blade be formed at the same time.

A still further object is to provide novel means for a secure and durable attachment of a handle to a blade.

These and other objects and advantages will appear and become more apparent as the description of the invention proceeds.

Referring now to the accompanying drawing forming a part of this application:

Fig. 1 is a top plan view of a litter shovel blade made in accordance with the invention.

Fig. 2 is a side elevational view of Fig. 1.

Fig. 3 is a sectional view on the line 3—3 Fig. 1.

Fig. 4 is a fragmental bottom plan view of the upper portion of the shovel blade.

Fig. 5 is a sectional view on the line 5—5 Fig. 1.

In the drawing, the reference numeral 1 indicates a unitary piece of sheet metal or similar material which may be suitable for the instant device.

In order to provide a light weight tool which may be handled for extended periods with the least amount of fatigue, I have provided suitable means for reenforcing a piece of light weight material, such as sheet metal of light gauge, whereby sufficient strength and durability is obtained to insure a practical and economical tool.

This reenforcing is accomplished by means of suitable beads formed in a prescribed pattern in the material 1.

An upwardly arched perimetric bead 2 is formed around the entire outer edge of the blade or body portion of the device, the said bead 2, preferably, being spaced inwardly from the outer edge sufficiently to permit the extreme outer edge to be finished off as by being bent arcuately upwardly as at 3, thereby forming a second bead 4 having its arcuate curve facing downwardly, or opposed to the bead 2. The bead 4, it will be noted, extends along the upper and side edges only of the blade, and the leading edge 5 thereof is specially designed for durability as well as strength.

The leading edge 5, as clearly seen in Fig. 5, is formed, as previously pointed out, with a bead 2 spaced from the outer edge thereof, and the extreme outer edge extends forwardly slightly as shown to provide ample catching area and is bent back upon itself to form a double thickness for durability and also to reenforce the leading edge in conjunction with the bead 2.

Further reenforcement for the blade is provided by the central bead 6 which runs perpendicular to the leading edge of the blade and joins the bead 2 substantially centrally of the upper edge of the blade as at 7, the union of the central bead 6 with the perimetric bead 2 being such as not to jeopardize the reenforcing strength of either bead.

In addition, a pair of opposed reenforcing beads 8 are provided intermediate of the central bead 6 and each side edge of the blade. Adjacent the upper edge of the blade the beads 8 converge arcuately toward the center of the blade as at 9 where they join the perimetric bead 2 and the central bead 6 in a smooth unbroken reenforcement for the blade.

Each of the beads 6 and 8 are smoothly joined with the perimetric bead 2 along the leading edge of the blade thereby forming a network of reenforcement for the blade.

To complete the blade as a litter shovel, the same should be foraminous, preferably as shown, as by openings 10 intermediate of the beads of the blade. These openings should be of such size as to permit the litter to fall through the blade while retaining the waste materials which it is desired to clean from the litter. To further facilitate the litter to fall through the blade while retaining the wastes, the spacers 11 intermediate of the openings 10 are preferably formed with an upward arch in the center thereof, thus insuring against litter being retained on the blade when in use. In addition, these arched spacers 11 also serve as a form of reenforcement for the blade.

Having thus provided a novel blade, a means 12 for attaching a handle to said blade is essential. This means is provided, preferably, in the form of a Y-shaped yoke, the opposed members or tines 13 of the yoke being arcuately shaped to the same curvature as the intermediate beads 8 and designed to lie within the beads 8 on the under side thereof as clearly shown in Fig. 4 of the drawing, the yoke having the stem portion 14 which forms a suitable shank for attaching a handle to the blade, as suggested in dotted lines in Figures 1 and 2.

The handle attaching means 12 is installed as above described preferably as by welding, soldering, or the like in order to insure a secure union between the blade and the yoke whereby a handle may be attached to the blade without weakening the latter.

It has been noted that in ordinary kitchen utensils which have a handle affixed to a flat blade, such as a pancake turner or the like, the place where breakage occurs is almost always at the connection of the handle and blade. With the instant yoke installed as above pointed out, breakage is reduced to an absolute minimum, thereby providing durability for the tool in this respect.

It will be noted that the tines 13 of the yoke are tapered toward their outer ends, this taper forms a gradual transition for the force of the handle to the blade and thereby greatly reduces the possibility of breakage at the critical point as above pointed out.

Having thus described my invention, what I claim is:

1. As a new article of manufacture, a litter shovel comprising a blade made of a unitary sheet of material, a continuous reenforcing bead formed about the perimeter of said blade, one edge of said blade being bent back upon itself outwardly from said bead to form the leading edge of said shovel, spaced intermediate beads extending between said leading edge and the trailing edge of said blade, said intermediate beads converging towards and joining each other at the trailing edge of said blade, said intermediate beads being joined with said perimetric bead at both the leading and trailing edge of said blade, the portion of said blade between said beads being perforated, and a substantially Y-shaped handle receiving yoke fixed to the underside of said blade and having the diverging arms thereof lying in said converging beads and the stem thereof projecting rearwardly of said blade to receive a handle for said blade.

2. As a new article of manufacture, a litter shovel comprising a blade made of a unitary sheet of material, a continuous reenforcing bead formed about the perimeter of said blade, one edge of said blade being bent back upon itself outwardly from said bead to form the leading edge of said shovel, spaced intermediate beads extending between said leading edge and the trailing edge of said blade, said intermediate beads converging towards and joining each other at the trailing edge of said blade, said intermediate beads being joined with said perimetric bead, the portion of said blade between said beads being perforated, and a substantially Y-shaped handle receiving yoke fixed to the underside of said blade and having the diverging arms thereof lying in said converging beads and the stem thereof projecting rearwardly of said blade to receive a handle for said blade, and the portions of said blade intermediate said perforations being pressed to form arcuate reenforcing surfaces intermediate of and joined with said intermediate beads.

CLARK O. WOTRING.

REFERENCES CITED

The following references are of record in the file of this patent:

UNITED STATES PATENTS

| Number | Name | Date |
|---|---|---|
| 455,557 | Wynkoop | July 7, 1891 |
| 554,989 | Daly | Feb. 18, 1896 |
| 928,283 | Schultze | July 20, 1909 |
| 996,621 | Danielson | July 4, 1911 |
| 1,194,924 | Anderson | Aug. 15, 1916 |
| 1,207,634 | Rugg | Dec. 5, 1916 |